(12) United States Patent
Sivertsen

(10) Patent No.: US 9,258,556 B2
(45) Date of Patent: Feb. 9, 2016

(54) DIGITAL SIGNAGE DEVICE CAPABLE OF ENTERING DIAGNOSTIC DISPLAY MODE

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 0 days.

(21) Appl. No.: 14/518,771

(22) Filed: Oct. 20, 2014

(65) Prior Publication Data
US 2015/0163483 A1 Jun. 11, 2015

Related U.S. Application Data

(63) Continuation of application No. 14/100,516, filed on Dec. 9, 2013, now Pat. No. 8,866,911.

(51) Int. Cl.
| | |
|---|---|
| *H04N 17/04* | (2006.01) |
| *G06K 9/00* | (2006.01) |
| *H04N 1/00* | (2006.01) |
| *H04N 21/258* | (2011.01) |
| *H04N 21/414* | (2011.01) |
| *H04N 21/4223* | (2011.01) |
| *H04N 21/44* | (2011.01) |
| *H04N 21/4425* | (2011.01) |
| *H04N 21/47* | (2011.01) |
| *H04N 21/658* | (2011.01) |
| *G06Q 30/02* | (2012.01) |

(52) U.S. Cl.
CPC .......... *H04N 17/045* (2013.01); *G06K 9/00362* (2013.01); *G06Q 30/02* (2013.01); *H04N 1/00204* (2013.01); *H04N 21/25883* (2013.01); *H04N 21/41415* (2013.01); *H04N 21/4223* (2013.01); *H04N 21/44008* (2013.01); *H04N 21/4425* (2013.01); *H04N 21/47* (2013.01); *H04N 21/6582* (2013.01)

(58) Field of Classification Search
CPC .................................................. H04N 17/045
USPC .................................. 348/177, 180–181, 189
See application file for complete search history.

(56) References Cited

U.S. PATENT DOCUMENTS

| | | | |
|---|---|---|---|
| 7,345,700 B2 * | 3/2008 | Nortrup | 348/180 |
| 7,519,703 B1 | 4/2009 | Stuart et al. | |
| 7,596,471 B1 | 9/2009 | Beland et al. | |
| 8,126,678 B2 | 2/2012 | Beland et al. | |

(Continued)

*Primary Examiner* — Paulos M Natnael
(74) *Attorney, Agent, or Firm* — Locke Lord LLP; Tim Tingkang Xia, Esq.

(57) ABSTRACT

One aspect of the disclosure directs to a signage device, which include a display device, a camera, and a signage controller. The display device is configured to display media content in a display mode and display diagnostic information in a diagnostic mode. The diagnostic information includes content operational and deployment information related to the media content being displayed, and system information of the signage device. The signage controller is configured to control the camera to capture an image frame, process the captured image frame to generate information for a server system such that the server system provides the media content to the signage controller based on the generated information, display the media content on the display device in the display mode, switch the display device to the diagnostic mode in response to a diagnostic input command, and display the diagnostic information on the display device in the diagnostic mode.

19 Claims, 6 Drawing Sheets

(56) References Cited

U.S. PATENT DOCUMENTS

| | | |
|---|---|---|
| 8,342,696 B2 | 1/2013 | Ivashin et al. |
| 8,866,911 B1 * | 10/2014 | Sivertsen ............ 348/177 |
| 2006/0279309 A1 | 12/2006 | Lee et al. |
| 2009/0319231 A1 * | 12/2009 | Beland et al. ............ 702/183 |
| 2010/0189312 A1 * | 7/2010 | Nielsen et al. ............ 382/113 |
| 2010/0324855 A1 | 12/2010 | Parker |
| 2012/0150476 A1 * | 6/2012 | Beland et al. ............ 702/118 |
| 2014/0375823 A1 * | 12/2014 | Lewis ............ 348/189 |

\* cited by examiner

DIGITAL SIGNAGE DEVICE CAPABLE OF ENTERING DIAGNOSTIC DISPLAY MODE

CROSS-REFERENCE TO RELATED PATENT APPLICATION

This application is a continuation application of U.S. patent application Ser. No. 14/100,516, filed Dec. 9, 2013, entitled "DIGITAL SIGNAGE DEVICE CAPABLE OF ENTERING DIAGNOSTIC DISPLAY MODE," by Clas Gerhard Sivertsen, which is incorporated herein in its entirety by reference.

FIELD

The present disclosure generally relates to digital signage devices, and more particularly to digital signage devices switchable between a normal display mode and a diagnostic mode.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Signage devices are widely used to deliver contents in the information broadcasting and advertising areas. Traditionally, signage devices include static display on signage device. Static signage devices may not be easily replaced, and their displays are not flexible and their contents are fixed. With modern technology particularly in the large LED/LCD display area, digital signage devices are currently widely used due to their easy-to-replace characteristics, high efficiencies, relatively low costs, flexible display contents with real-time update ability. The digital signage devices can be used to show television programming, advertisements, traffic information, directional displays, menus, information, and other messages. Signage devices usually utilize technologies such as a matrix of lighting devices (e.g., light bulbs), LEDs, LCD, LED, plasma displays, or projected images to display content. Digital signage devices can be found in both public and private environments, including retail stores, hotels, restaurants, and corporate buildings, amongst other locations.

Signage devices generally do not display diagnostic data. But during routine testing and maintenance or field troubleshooting, a technician may have a need to review those data to perform testing or to identify the problems of the signage devices.

Therefore, heretofore unaddressed needs still exist in the art to address the aforementioned deficiencies and inadequacies.

SUMMARY

Certain aspects of the present disclosure direct to a signage device, which includes: a display device, configured to display media content in a display mode and display diagnostic information in a diagnostic mode, where the media content is configured to be provided to the signage device by a server system, and where the diagnostic information includes content operational and deployment information related to the media content being displayed, and system information of the signage device; a camera configured to capture an image frame; and a signage controller in communication with the display device. The signage controller includes a processor and a non-volatile memory storing computer executable code. The code, when executed at the processor, is configured to: control the camera to capture the image frame, process the captured image frame to generate information for the server system, wherein the server system is configured to provide the media content to the signage controller based on the generated information, display the media content on the display device in the display mode, switch the display device from the display mode to the diagnostic mode in response to a diagnostic input command, and display the diagnostic information on the display device in the diagnostic mode.

In certain embodiments, the code is configured to process the captured image frame by: detecting persons in the image frame; generating a demographic-map data structure, wherein the demographic-map data structure contains demographic information of the persons detected in the image; storing the demographic-map data structure in a data queue; sending the demographic-map data structure stored in the data queue to the server system; and receiving the media content provided by the server system in response to the demographic-map data structure.

In certain embodiments, the content operational and deployment information includes the demographic-map data stored in the data queue and content information specifying the media content related to the demographic-map data.

In certain embodiments, the code includes: a camera control module configured to control the camera to capture the image frame; a video converter configured to convert the image frame to digital image frame data; a demographic information collector configured to store the digital image frame data to a frame queue, to receive the demographic-map data structure from an image processing engine, to store the demographic-map data structure in the data queue, and to send the demographic-map data structure in the data queue to the server system; a diagnostic module configured to receive the diagnostic input command, and to switch the signage device from the display mode to the diagnostic mode in response to the diagnostic input command; and a player manager module configured to receive the media content provided by the server system in response to the demographic-map data structure, to display the media content on the display device in the display mode, and to display the diagnostic information on the display device in the diagnostic mode. In certain embodiments, the image processing engine is configured to retrieve the digital image frame data from the frame queue, to generate the demographic-map data structure according to the digital image frame data, and to send the demographic-map data structure to the demographic information collector. In certain embodiments, the demographic information collector includes an image-processing-engine interface, where the image-processing-engine interface defines a function to configure the image processing engine collecting information in the demographic-map data structure.

In certain embodiments, the server system includes: a demographic information server in communication with the signage controller via a network, wherein the demographic information server is configured to receive the demographic-map data structure from the signage controller, and to generate demographic information according to the demographic-map data structure; a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

In certain embodiments, the demographic information server includes a data store configured to store the demographic information.

In certain embodiments, the storage service includes: a content storage configured to store the digital media content data; and a media deployment module configured to request the demographic information from the demographic information server, to generate the program list according to the demographic information, and to send the program list as the display content to the digital signage device via the network.

In certain embodiments, the content operational and deployment information includes the information requested from the DSCS.

Certain aspects of the present disclosure direct to a method of controlling a signage device, including: controlling, by a signage controller of the signage device, a camera of the signage device to capture an image frame; processing, by the signage controller, the captured image frame to generate information for a server system, where the server system is configured to provide media content to the signage controller based on the generated information; displaying, by the signage controller, the media content on a display device of the signage device in a display mode; switching, by the signage controller, the display device of the signage device from the display mode to a diagnostic mode in response to a diagnostic input command; and displaying, by the signage controller, diagnostic information on the display device in the diagnostic mode, where the diagnostic information includes content operational and deployment information related to the media content being displayed, and system information of the signage device.

In certain embodiments, the step of processing the captured image frame includes: detecting, by the signage controller, persons in the image frame; generating, by the signage controller, a demographic-map data structure, wherein the demographic-map data structure contains demographic information of the persons detected in the image; storing, by the signage controller, the demographic-map data structure in a data queue; sending, by the signage controller, the demographic-map data structure stored in the data queue to the server system; and receiving, by the signage controller, the media content provided by the server system in response to the demographic-map data structure. In certain embodiments, the content operational and deployment information includes the demographic-map data stored in the data queue and content information specifying the media content related to the demographic-map data.

In certain embodiments, the signage controller includes a non-volatile memory storing computer executable code, where the code includes: a camera control module configured to control the camera to capture the image frame; a video converter configured to convert the image frame to digital image frame data; a demographic information collector configured to store the digital image frame data to a frame queue, to receive the demographic-map data structure from an image processing engine, to store the demographic-map data structure in the data queue, and to send the demographic-map data structure in the data queue to the server system; a diagnostic module configured to receive the diagnostic input command, and to switch the signage device from the display mode to the diagnostic mode in response to the diagnostic input command; and a player manager module configured to receive the media content provided by the server system in response to the demographic-map data structure, to display the media content on the display device in the display mode, and to display the diagnostic information on the display device in the diagnostic mode. In certain embodiments, the image processing engine is configured to retrieve the digital image frame data from the frame queue, to generate the demographic-map data structure according to the digital image frame data, and to send the demographic-map data structure to the demographic information collector. In certain embodiments, the demographic information collector includes an image-processing-engine interface, wherein the image-processing-engine interface defines a function to configure the image processing engine collecting information in the demographic-map data structure.

In certain embodiments, the server system includes: a demographic information server in communication with the signage controller via a network, wherein the demographic information server is configured to receive the demographic-map data structure from the signage controller, and to generate demographic information according to the demographic-map data structure; a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

In certain embodiments, the demographic information server includes a data store configured to store the demographic information. In certain embodiments, the content operational and deployment information includes the information requested from the DSCS.

In certain embodiments, the storage service includes: a content storage configured to store the digital media content data; and a media deployment module configured to request the demographic information from the demographic information server, to generate the program list according to the demographic information, and to send the program list as the display content to the digital signage device via the network.

Certain aspects of the present disclosure direct to a non-transitory computer readable medium storing computer executable code. The code, when executed at a processor, is configured to: control a camera of a signage device to capture an image frame, process the captured image frame to generate information for a server system, wherein the server system is configured to provide media content to the signage device based on the generated information, display the media content on a display device of the signage device in a display mode, switch the display device of the signage device from the display mode to a diagnostic mode in response to a diagnostic input command, and display diagnostic information on the display device in the diagnostic mode, where the diagnostic information includes content operational and deployment information related to the media content being displayed, and system information of the signage device.

In certain embodiments, the code, when executed at a processor, is configured to process the captured image frame by: detect persons in the image frame, generate a demographic-map data structure, where the demographic-map data structure contains demographic information of the persons detected in the image, store the demographic-map data structure in a data queue, send the demographic-map data structure stored in the data queue to the server system, and receive the display content provided by the server system in response to the demographic-map data structure. In certain embodiments, the content operational and deployment information includes the demographic-map data stored in the data queue and content information specifying the media content related to the demographic-map data.

In certain embodiments, the code includes: a camera control module configured to control the camera to capture the image frame; a video converter configured to convert the image frame to digital image frame data; a demographic information collector configured to store the digital image frame data to a frame queue, to receive the demographic-map data structure from an image processing engine, to store the demographic-map data structure in the data queue, and to send the demographic-map data structure in the data queue to the server system; a diagnostic module configured to receive the diagnostic input command, and to switch the signage device from the display mode to the diagnostic mode in response to the diagnostic input command; and a player manager module configured to receive the media content provided by the server system in response to the demographic-map data structure, to display the media content on the display device in the display mode, and to display the diagnostic information on the display device in the diagnostic mode. In certain embodiments, the image processing engine is configured to retrieve the digital image frame data from the frame queue, to generate the demographic-map data structure according to the digital image frame data, and to send the demographic-map data structure to the demographic information collector. In certain embodiments, the demographic information collector comprises an image-processing-engine interface, wherein the image-processing-engine interface defines a function to configure the image processing engine collecting information in the demographic-map data structure.

In certain embodiments, the server system includes: a demographic information server in communication with the signage controller via a network, wherein the demographic information server is configured to receive the demographic-map data structure from the signage controller, and to generate demographic information according to the demographic-map data structure; a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

In certain embodiments, the demographic information server includes a data store configured to store the demographic information.

In certain embodiments, the content operational and deployment information includes the information requested from the DSCS.

In certain embodiments, the storage service includes: a content storage configured to store the digital media content data; and a media deployment module configured to request the demographic information from the demographic information server, to generate the program list according to the demographic information, and to send the program list as the display content to the digital signage device via the network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
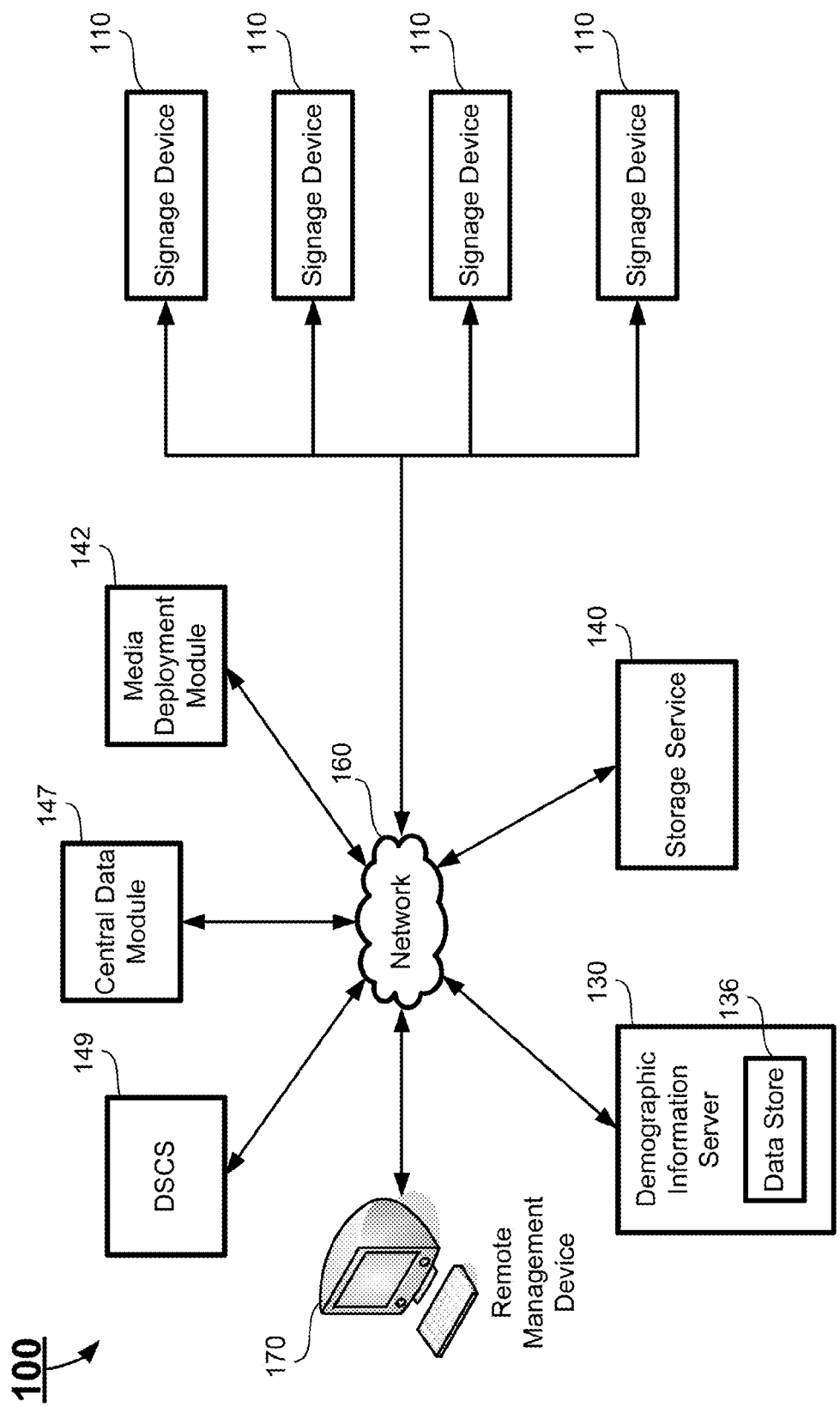
FIG. 1 schematically depicts a signage device system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 schematically depicts a signage device system according to one embodiment of the present disclosure. As shown in FIG. 1, the signage device system 100 includes one or more signage devices 110. The signage devices 110 are respectively connected to one or more remote servers via a network 160. In certain embodiments, the remote servers may include a demographic information server 130, a storage service 140 and a digital signage control service ("DSCS") 149. Optionally, a remote management device 170 is connected to the signage devices 110 via the network 160. It should be appreciated that the signage device system 100 as shown of FIG. 1 only represent an exemplary embodiment of the present disclosure, and therefore should not be considered to limit the disclosure in any manner. In certain embodiments, the system 100 may include other physical or virtual components not shown in FIG. 1.

The signage devices 110 are content displaying devices for displaying digital media content data. In certain embodiment, for displaying purposes, the signage devices 110 are positioned at shopping malls, department stores, building outer walls, or any other areas where the viewers may see the contents displayed on the signage devices 110 without obstruction. In certain embodiments, the signage devices 110 may be divided into one or more signage device groups. In other words, the signage device system 100 may have one or more signage device groups, and each signage device group may have one or more signage devices 110. To identify the signage device groups and the signage devices 110, each signage device group may have a particular group ID, and each signage device 110 may have a particular signage device ID.

Figure 2A:
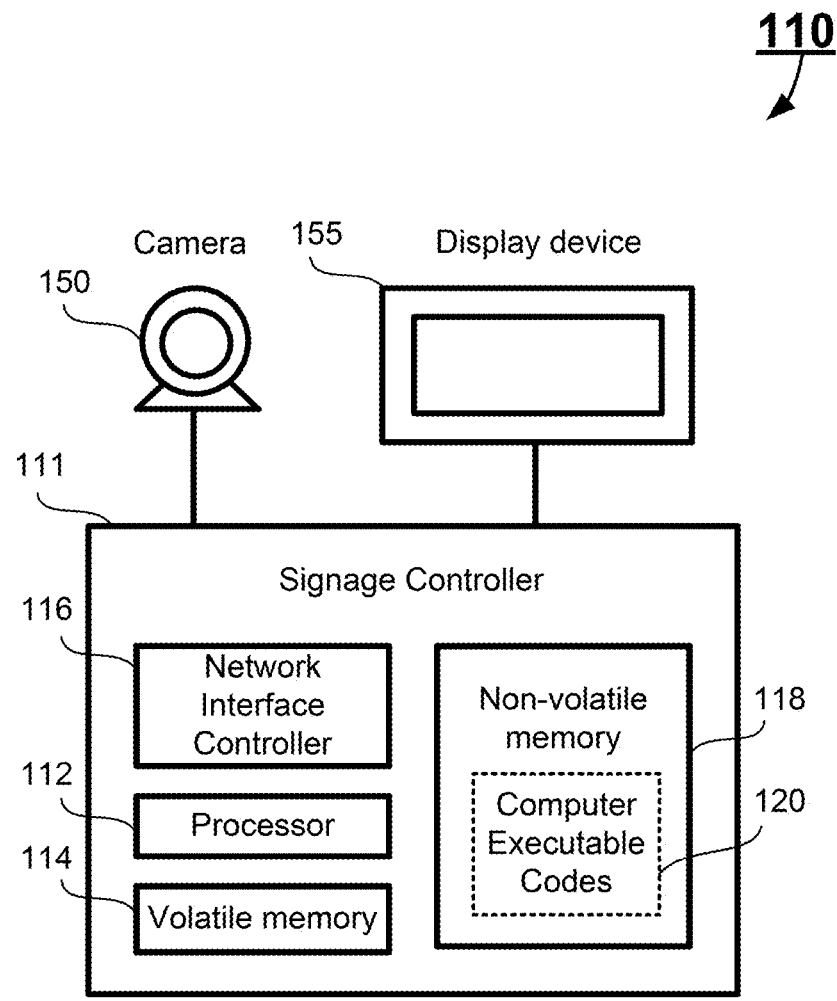
FIG. 2A schematically depicts a signage device of the signage device system according to one embodiment of the present disclosure.

FIG. 2A schematically depicts a signage device 110 according to one embodiment of the present disclosure. As shown in FIG. 2A, the signage device 110 includes a signage controller 111, a camera 150, and a display device 155. The camera 150 and the display device 155 are connected to and controlled by the signage controller 111. In certain embodiments, the signage device 110 may include other physical or virtual components not shown in FIG. 2.

The signage controller 111 is a controlling device to control the signage device 110. As shown in FIG. 2A, the signage controller 111 includes a processor 112 for executing instructions, a volatile memory 114, a network interface controller 116, and a non-volatile memory 118. The signage controller 111 may be a regular computer, a special purpose computer, or a specialized microcontroller capable of being installed in a computer, such as a service processor (SP) or a baseboard management controller (BMC). In certain embodiment, the signage controller 111 may be integrated with the signage device 110, or be separated from the signage device 110 as a remote controlling device of the signage device 110.

The processor 112 is a host processor of the signage controller 111, controlling operation and executing instructions of the signage controller 111. The volatile memory 114 is a temporary memory storing information in operation, such as the instructions executed by the processor 112. For example, the volatile memory 114 may be a random-access memory (RAM). In certain embodiments, the volatile memory 114 is in communication to the processor 112 through appropriate buses or interfaces. In certain embodiments, the signage controller 111 may include more than one processor 112 or more than one volatile memory 114.

The network interface controller 116 is an interface for performing network communications with the network 160. The network interface controller 116 is in communication to the processor 112 through appropriate buses or interfaces. In certain embodiments, the signage controller 111 may include more than one network interface controller 116 for connecting to different networks.

The non-volatile memory 118 is a persistent memory for storing data and instructions even when not powered. For example, the non-volatile memory 118 can be a flash memory. In certain embodiments, the non-volatile memory 118 is in communication to the processor 112 through appropriate buses or interfaces. In certain embodiments, the signage controller 111 may include more than one non-volatile memory 118.

As shown in FIG. 2A, the non-volatile memory 118 stores computer executable codes 120. The codes 120 are configured, when executed at the processor 112, to control the camera 150 to capture the image, to interact with an image processing module by sending the captured image to the image processing module and receiving demographic-map data corresponding to the captured image from the image processing module, to switch between a display mode and a diagnostic mode in response to a diagnostic input command, and to control the display device 155 to display contents corresponding to the mode. Details regarding the demographic-map data and the modes will be described below.

Figure 2B:
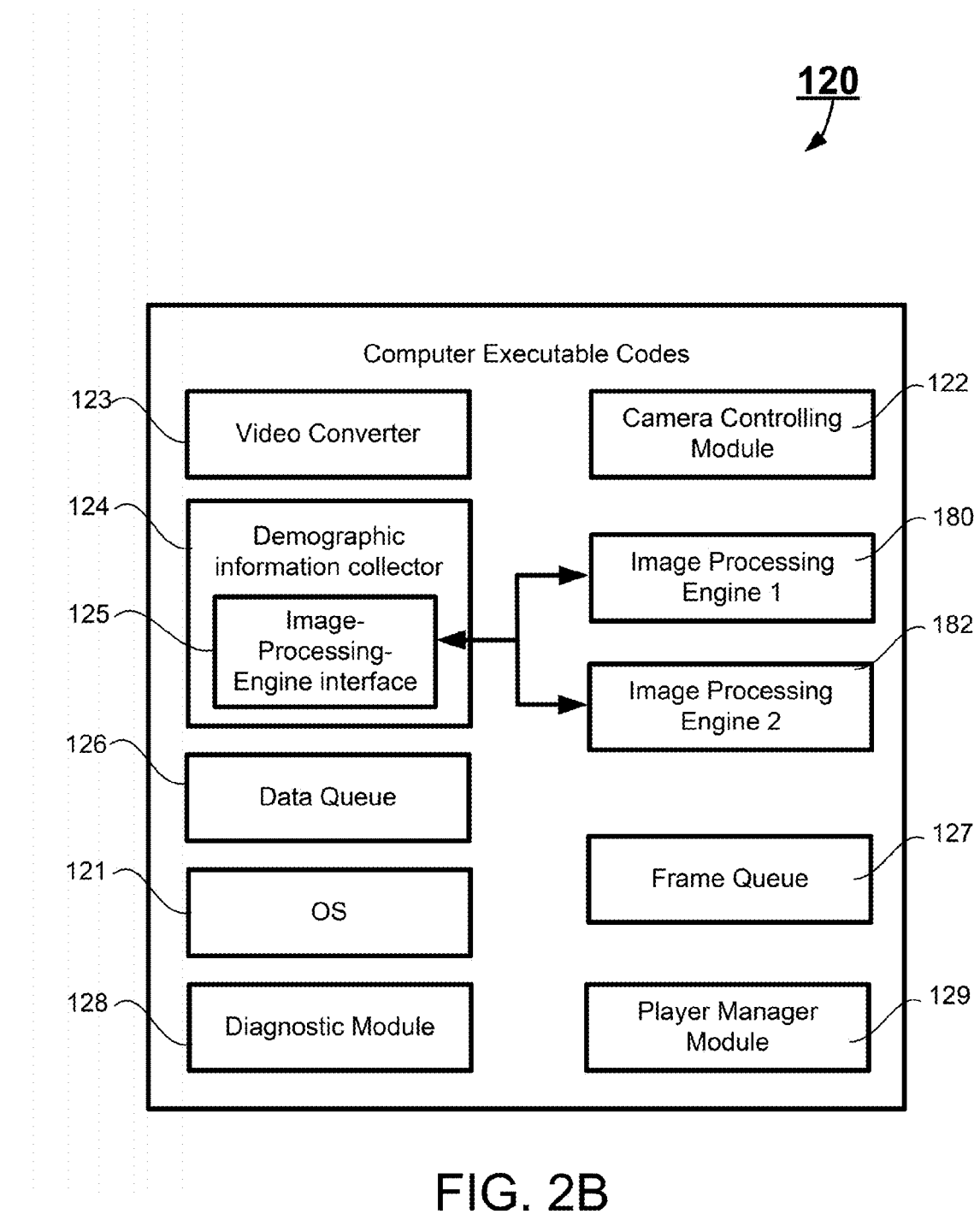
FIG. 2B schematically depicts computer executable codes of a signage controller according to one embodiment of the present disclosure.

FIG. 2B schematically depicts the codes 120 of the signage controller 111 according to one embodiment of the present disclosure. As shown in FIG. 2B, the codes 120 of the signage controller 111 include an operating system or kernel 121, a camera controlling module 122, a video converter 123, a demographic information controller 124, a data queue 126, a frame queue 127, a diagnostic module 128, a player manager module 129, and one or more image processing engines 180 and 182. From now on, OS refers to either an operating system or a kernel, unless otherwise noted. In certain embodiments, the codes 120 may include other components not shown in FIG. 2B.

The OS 121 can be collective management software managing the operation of the signage controller 111. For example, the OS 121 can include a set of functional programs that control and manage operations of the devices connected to the signage controller 111, such as the network interface controller 116, the camera 150, the display device 155, and other devices. The set of application programs provide certain utility software for the user to manage the signage controller 111. For example, the codes 120 may include a graphical user interface application program such that the user may change the setting of the signage controller 111 through the graphical user interface. In certain embodiments, the operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

The camera controlling module 122 is an application program for controlling the operation of the camera 150. The camera controlling module 122 can instruct the camera 150 when (e.g., through a time schedule) to capture the videos and also set the frame rate for the video (e.g., 30 frames per second). If the camera 150 generates analog video signals, those signals are initially sent to the video converter 123.

The video converter 123 is an analog to digital (A/D) converting module for converting the frames in the analog format to digital image frame data. In certain embodiments, the video converter 123 receives the analog signals of the frames, and converts the analog signals to the digital image frame data. After the A/D conversion, the video converter 123 sends the digital image frame data to the demographic information collector 124.

The frame queue 127 is a frame data store for storing the digital image frame data. The image frames from the digital camera or from the video converter 123 are initially stored in the frame queue 127. As will be described below, the image processing engine can retrieve data for an image frame from the frame queue 127 and then process that frame.

The demographic information collector 124 is a module that can process image frames to determine demographic information. The demographic information collector 124 provides a framework into which different image processing engines may be plugged into, depending on the needs. For example, different imaging processing engines may use different algorithms to process an image and, thus, are suitable to generate different type of demographic information or emphasize different efficiency factors (e.g., speed vs. accuracy). In certain embodiments, the demographic information collector 124 is configured to retrieve an image frame from the frame queue 127 and send the digital image frame data to an image processing engine 180 or 182, to receive the demographic-map data from the image processing engine 180 or 182, and to send the demographic-map data to the demographic information server 130 via the network 160. The demographic information collector 124 initiates one of the image processing engines (for example, the image processing engine 180) for processing the digital image frame data, and sets up the configuration of the image processing engine 180. The demographic information collector 124 then calls the image processing engine 180 to process the current digital image frame data and to generate the demographic-map data. When the image processing engine 180 sends back the demographic-map data, the demographic information collector 124 stores the demographic-map data in the data queue 126, and periodically sends the demographic-map data in the data queue 126 to the demographic information server 130 via the network 160.

In certain embodiments, the demographic information collector 124 can provide the common framework for holding an image processing engine through an image-processing-engine interface 125. For example, the image-processing-engine interface 125 is an application programming interface (API). Each of the image processing engines 180 and 182 implements the functions defined by the image-processing-engine interface 125. The demographic information collector 124 understands the image-processing-engine interface 125 and can invoke those implemented functions of an image processing engine once the image processing engine is linked to the demographic information collector 124.

The image-processing-engine interface 125 provides a function that the demographic information collector 124 can use to configure the image processing engine implementing the image-processing-engine interface 125. Through that function, the demographic information collector 124 can configure what types of demographic information it should collect. For example, the demographic information collector 124 can configure the image processing engine to collect personal attributes such as gender, age, ethnicity, height, skin color, hair color, hair length, facial hair, weight, static/in motion, accessories, stroller, glasses, beard, tie, brief-case, and suit-case information of each viewer. Further, the demographic information collector 124 can also configure the image processing engine to collect data relating to a person's behavior such as the duration at the scene (i.e., how long a person has stayed at the scene), attentiveness (i.e., whether a person is paying attention to the content displayed at the signage device 110) or gestures (i.e., whether a person uses hand gestures to show certain signals). In certain embodiments, to allow technicians to perform routine testing or maintenance of the signage device 110, the demographic information collector 124 can also configure the image processing engine to collect data of certain personal attributes of the technicians, such as the work suits or other identification showing the identity of the technicians, such that the technician may use gestures to perform certain actions to the signage device 110, e.g., switching the signage device 110 from a display mode to a diagnostic mode. In certain embodiments, those configurations can be set up in a configuration file, which will be read by the image processing engine.

The image-processing-engine interface defines a function that the demographic information collector 124 can call to pass on an image frame and then in response receive demographic-map data returned from an implementing image processing engine.

The demographic-map data includes viewer data recognized from the image frames. In certain embodiments, the demographic-map data includes at what time (time information) and at what location (location information) the frame was generated, and viewer information related to the persons appearing in the image. The viewer information can include scene- and personal-attribute data and personal behavior data generated. In general, the scene- and personal-attribute data can be generated by processing a single image, while the personal-behavior data can be generated by processing more than one frame. For example, the personal attribute data can relate to appearance and body features, and the personal behavior data can relate to viewers' actions observed in a period of time. Examples of the personal attribute data include gender, age, ethnicity, height, skin color, hair color, hair length, facial hair and weight. Examples of the personal behavior data include duration and attentiveness.

The data queue 126 is a data store that is used by the demographic information collector 124 to temporarily store the demographic-map data. When the image processing engine 180 sends back the demographic-map data, the demographic information collector 124 stores the demographic-map data in the data queue 126. The demographic information collector 124 can periodically send the demographic-map data in the data queue 126 to the demographic information server 130 via the network 160, and periodically remove the demographic-map data in the data queue 126. In certain embodiments, for diagnostic purposes, the demographic-map data is stored in the data queue 126 for a certain period of time after the demographic information collector 124 sends the demographic-map data in the data queue 126 to the demographic information server 130 via the network 160. In other words, the period of removing the demographic-map data in the data queue 126 is longer than the period of sending the demographic-map data in the data queue 126 to the demographic information server 130 via the network 160.

The diagnostic module 128 is a module that controls and manages diagnostic information of the signage controller 111. Generally, the signage device 110 is in a display mode for displaying the media contents. However, on certain occasions such as installation, routine testing and maintenance, or trouble-shooting of the signage device 110, a technician may be in need of certain diagnostic information of the signage device 110 for monitoring the system condition and identifying any problem that may occur on the signage device 110. In certain embodiments, the technician may input a diagnostic input command to the signage device 110 to trigger the diagnostic module 128. When triggered, the diagnostic module 128 switches the signage device 110 from the display mode to the diagnostic mode. In the diagnostic mode, the diagnostic module 128 may collect the diagnostic information to create a diagnostic information file, and provide the diagnostic information file to the player manager module 129.

The diagnostic information may include system information of the signage device 110. For example, the system information of the signage device 110 may include signage device 110 status, operational parameters, configuration, signage device ID, wired and wireless network connectivity, GPS data/location, light sensors, operation times, color, brightness and contrast information, up-time, down-time, errors, warnings, usage statistics, performance, CPU utilization, bandwidth, loading, latency, attempted intrusions and attacks, SSD/HDD/flash card storage, available capacity, or any other signage device system information. In this case, the diagnostic module 128 may collect the diagnostic information from the OS 121 to obtain the system information.

The operational parameters typically include parameters generated by all components or modules of the signage device 110 during operation. For example, the operational parameters of the camera 150 may include the position of the camera, the focus of the camera, the lens adjustment, and the zoom-level of the camera. In certain embodiments, the diagnostic information may include the actual camera output of the camera 150, such that the technician can see what the camera sees to adjust the operational parameters of the camera 150. In this case, the diagnostic module 128 may collect the operational parameters of the camera 150 from the camera controlling module 122 to obtain the actual camera output signal. Other examples of the devices of the signage device 110 may include certain hardware board modules such as a USB connector, a card reader, a radio-frequency identification (RFID) reader, or a near-field communication (NFC) reader, and the diagnostic information may include the operational parameters of these hardware board modules.

Further, the diagnostic information may include content operational and deployment information related to the media content displayed on the signage device 110. For example, the content operational and deployment information may include the demographic-map data stored in the data queue 126 and content information related to the demographic-map data to indicate the relationship between the demographic-map data of the viewers and the related contents the viewers see at the time the demographic-map data is obtained. In certain embodiments, the content operational information may be obtained from the data queue 126 and the program list. For example, the content operational information may include the demographic-map data related to specific media content. The specific media content may be identified by one or more IDs and the time slot for the content being displayed. In certain embodiments, the IDs of the media content may include a provider ID identifying the particular content provider, a campaign ID identifying a particular campaign, and a content ID identifying a particular media file. In this case, the diagnostic module 128 may collect the content operational information from the data queue 126 to obtain the demographic-map data, and from the player manager module 129 to obtain the metadata in the program list, which contains the IDs and the time slot information.

In certain embodiments, the content deployment information can be obtained from the DSCS 149. For example, the content deployment information may include information about campaigns, providers, playback statistics of particular contents, earned revenue, and time slot availability and utilization. In certain embodiments, those data typically can be stored in various data collections in the central data module 147. In this case, the diagnostic module 128 may collect the content deployment information by sending a request to the DSCS 149, which in turn retrieves the data from the central data module 147 and send the data to the diagnostic module 128. Details regarding the campaign will be described below.

The diagnostic module 128 can be triggered in different manners to enter the diagnostic mode and take control of the signage device 110. For example, as described above, a technician may use hand gestures to show a sign in front of the camera 150 for switching the signage device 110 to the diagnostic mode. By processing the image frames of the gestures, the demographic information collector 124 may identify the gestures as a diagnostic input command, and sends the diagnostic input command to the diagnostic module 128 to trigger the diagnostic module 128 to switch to the diagnostic mode. In certain embodiments, when the diagnostic information shown on the display device 155 is over one page, the technician may use hand gestures to show signs of scrolling the page or flipping between the pages.

In certain embodiments, the diagnostic module 128 may include a public cryptographic key, and the technician may have a portable device storing a private cryptographic key corresponding to the public cryptographic key. The portable device may be a laptop computer, a smartphone, a tablet or any other portable device having a display device. Thus, the technician may use a web browser or other applications on the portable device to generate, according to the private cryptographic key, a visual representation of an encrypted code, such as QR code. By processing the image frames of the visual representation, the demographic information collector 124 may identify the encrypted code as a diagnostic input command, and sends the encrypted code to the diagnostic module 128. The diagnostic module 128 may then decrypt the encrypted code using the public cryptographic key. Through the decrypted code, the diagnostic module 128 can authenticate the identity of the technician. An authenticated command can trigger the diagnostic module 128 to switch to the diagnostic mode.

In certain embodiments, the signage controller 121 may provide other devices for the technician to input the diagnostic input command. Examples of the devices may include a USB connector, a RFID reader, a NFC reader or other smart card reader. Thus, when the camera 150 is broken or out of focus, the technician may use a USB flash drive, a RFID tag or a NFC enabled smart card to input the diagnostic input command without using the camera 150. The signage controller 121 may recognize the diagnostic input command, and send the diagnostic input command to the diagnostic module 128 to trigger the diagnostic module 128 to switch to the diagnostic mode.

The player manager module 129 is a module store for controlling and displaying content data and diagnostic data on of the display device 155. When the signage device 110 is in the display mode, the player manager module 129 periodically requests and downloads a program list for the signage device 110 from the DSCS 149. When the player manager module 129 receives the program list, the player manager module 129 downloads the media contents specified in the program list from the storage service 140. Thus, the player manager module 129 can display the downloaded media contents on the display device 155 at the time specified in the program list.

On the other hand, when the signage device 110 is in the diagnostic mode, the player manager module 129 receives the diagnostic information file from the diagnostic module 128, and controls the display device 155 to display the diagnostic information in the diagnostic information file on the display device 155.

As discussed above, the demographic information collector 124 can use an image processing engine 180 or 182 that implements the functions of the image-processing-engine interface.

Once receiving an image frame from the demographic information collector 124, the image processing engine 180 or 182 can preprocess the image frame to obtain default features (such as corner, line, edge, and center-surrounded features) or features as configured by the demographic information collector 124.

The image processing engine can use various techniques to process those features in order to detect persons in the image frame as well as the personal attributes of each person. For example, based on the needs, the image processing engine can use one or more of a naïve/normal classifier, binary decision trees, boosting techniques, random trees, a Haar classifier, and a Viola-Jones classifier. The image processing engine can adjust the weight/importance factors of some or all of the features and according to which the features are evaluated by the image processing engine to detect different attributes.

After processing each of the image frame received, the image processing engine can detect how many people appear in the image frame and the personal attributes of each of the people. Further, in certain embodiments, the image processing engine may group one or more persons in a default category or a category configured by the demographic information collector 124. For example, the image processing engine can examine the personal attributes of each person and determine which category that person should be assigned to. Thus, the image processing engine can determine the number of people in each category. The image processing engine can also use other techniques such as a k-means cluster.

Then, the image processing engine can use those detected information to construct a demographic-map data structure. For example, the demographic-map data structure can be a JSON object. In this example, the demographic-map data structure can include a timestamp indicating to what time the demographic-map data is directed to, the number of people detected, and the personal attributes of each of the detected person.

The camera 150 is an image capturing device for capturing images of the people passing by or viewing the signage device 110. From now on those people are collectively referred to as the viewers unless otherwise noted. In certain embodiments, the images captured by the camera 150 are in the format of analog video, which includes one or more image frames. In certain embodiments, the camera 150 can directly generate digital image frames. To capture the image of the viewers of the signage device 110, the camera 150 is positioned to capture images of an area where the viewers are generally expected. In certain embodiments, the signage device 110 may include more than one camera 150. The camera 150 can be connected to a USB connector of the signage controller 111 and, therefore, transmit the images either in digital format or in analog format to the signage controller 111.

The display device 155 is a display screen for showing contents to the viewers under the control of the player manager module 129. In the display mode, the contents may include display content, such as the digital media contents. In the diagnostic mode, the contents may include diagnostic information. In certain embodiment, for displaying purposes, the signage device 110 may include more than one display device 155 to form a signage device wall, and each display device 155 may respectively display the same or different contents.

The demographic information server 130 receives the demographic-map data structures from one or more signage devices 110. In certain embodiments, the signage device system 100 may include more than one demographic information server 130. In certain embodiments, the demographic information server 130 includes a data store 136, as shown in FIG. 1, which is configured to store the demographic information.

After the demographic information server 130 receives a demographic-map data structure, the demographic information server 130 stores the demographic information about time and location specified in the data structure in the data store 136. By storing the demographic-map data structures continuously received from multiple signage devices 110 at different locations, the demographic information server 130 eventually stores the demographic information at different locations and times. Further, the demographic information server 130 can process those demographic-map data to identify any demographic patterns and trends. Based on those patterns and trends, the demographic information server 130 can further predict times and locations at which certain demographic groups (e.g., male viewers between age 30-40) will be present.

The storage service 140 stores media content files to be delivered to and played at each signage device 110. In certain embodiments, the storage service 140 provides a mechanism to allow other components of the signage device system 100 to store data objects in the storage service 140. For example, the storage service 140 can provide a write function that another component can call to pass on a data object. After receiving the data object, the storage service 140 stores the data object and generate a data-object identifier identifying the stored data object. The storage service 140 can return the data-object identifier back to the component requesting to store the data object. The storage service 140 can further provide a read function that another component can call to retrieve a data objects stored in the storage service 140 using a data-object identifier. As stated, the storage service 140 can retrieve the data object identified by the data-object identifier and return the retrieved data object back to the component requesting to retrieve the data object.

The media deployment module 142 manages the contents (e.g. various advertisement videos) to be displayed at each signage device 110. In general, the media deployment module 142 in accordance with a user's instructions facilitates the deployment one or more media files from one or more storage servers to one or more signage devices 110. The user can directly specify the selected timeslots and signage devices 110 for displaying a media file. Alternatively, the user can specify certain criteria for selecting timeslots and signage devices 110 for a specific campaign. The media deployment module 142 then utilizes certain determination logic to determine the specific timeslots and signage devices 110 for displaying the media file in accordance with the user's criteria.

For example, the media deployment module 142 can create a program list for each signage device 110 and deliver the program list to the signage device 110. The program list can specify the time slots for a specific content to be played at the signage device 110. The program list can also include metadata identifying and describing the content specified in the program list. For example, the metadata can describe the category of advertisement content, the format of the content, the length of the content, and the product in the advertisement. In certain embodiments, the metadata may include one or more IDs, including a provider ID identifying the content provider, a campaign ID identifying a campaign, and a content ID identifying a media file. The media deployment module 142 can also provide a storage link (e.g., a uniform resource identifier) for each specific media file (e.g. also via the program list). Using the storage link, the player manager module 129 of the signage device 110 can request and download the specific content from the storage service 140. In this way, the signage device 110 can download the contents specified in the program list. The player manager module 129 of the signage device 110 can playback the downloaded contents at the time slots specified in the program list.

In certain embodiments, the media deployment module 142 determines the program list based on predicted demographic information associated with the each signage device 110. The media deployment module 142 can request demographic information from the demographic information server 130 at the location of the signage device 110 and at a specific time period. Based on the demographic information received, the media deployment module 142 can choose content in the campaign for the specific time period. For example, the media deployment module 142 can receive information that at the location of a signage device 110 in a shopping mall every Saturday between 2 PM to 4 PM, most of the viewers are male between 30 to 40 years old. Based on that information, the media deployment module 142 can determine and choose a sports-car-advertisement video from all videos of the campaign to be played at that signage device 110 every Saturday between 2 PM to 4 PM. Using these techniques, the media deployment module 142 can determine a program list for each digital signage device 110.

A campaign is implemented by displaying one or more media files at various time slots of selected signage devices 110 of the signage device system 100. For example, an advertisement provider may provide a campaign to include ten advertising video files for a signage device system 100 having five signage devices 110. To display the ten advertising video files at the five signage devices 110, a campaign deployment plan file can be created to identify, for each selected signage device 110, the advertising video files to be played at the signage device 110 and the corresponding time slots for each advertising video file to be played. Thus, the central data module 147 stores the campaign deployment plan file for the campaign. The media deployment module 142 can generate and send deployment instructions to the DSCS 149 for deploying the associated media files of the campaign to the corresponding signage devices 110 according to the campaign deployment plan.

Further, for a specific advertising campaign, a user may instruct the media deployment module 142 to deploy the various media files to various timeslots at various signage devices 110. Based on the user's instruction, the media deployment module 142 can construct a campaign deployment plan (i.e., an instruction for deploying media content), which, according to one embodiment, can include information relating to that particular advertising campaign. Specifically, a campaign deployment plan identifies particular deployment information. This deployment information can include a group ID, which identifies which group of digital signage devices 110 has been selected to display the campaign, and/or a signage device ID, which identifies a specific signage device 110 selected to display the campaign. For example, the group of signage devices 110 can all belong to a private network. The deployment information can also include one or more content IDs identifying the one or more media files to be displayed at the selected timeslots of the selected signage devices 110. A user can create a campaign that displays the same one or more media files in one or more groups of signage devices 110. Alternatively, a user can create a campaign having a single media file to be displayed a single time on a single signage device 110.

Additionally, according to one embodiment, the deployment information can include time slot information, which indicates the date(s) and time(s) when the campaign is to be displayed. Again, a user could create a long-running campaign in which content is to be displayed multiple times each day for an entire month. Alternatively, a user could create a campaign to appear on a singly signage device 110 at a specific time. For example, an individual could create a campaign consisting of a "FURNITURE ON SALE" message that is to run on a particular signage device, on a particular date, at a particular time. Finally, in one embodiment, the deployment information may include a content ID that identifies the particular media content (e.g., a single "FURNITURE ON SALE" message, a 60-second soft drink commercial, etc.).

In certain embodiments, after the media deployment module 142 determines a campaign deployment plan for a specific campaign, the user can review the deployment plan and then instruct the media deployment module 142 to execute the campaign deployment plan. The media deployment module 142 informs the DSCS 149 that the specific campaign is ready to be deployed. For example, the media deployment module 142 can store a campaign deployment plan to the central data module 147 and identifies that campaign deployment plan with a campaign ID. Subsequently, the media deployment module 142 can send the campaign ID to the DSCS 149 and then request to the DSCS 149 to deploy that campaign.

The central data module 147 is a collective storage module for storing campaign deployment plan files and other corresponding information related to all campaigns for the signage device system 100.

It should be appreciated that an advertisement provider may provide one or more campaigns and one or more media files. Each campaign has its own campaign deployment plan file, and different campaigns may include the same contents. To identify each campaign, the campaign deployment plan file may include a provider ID to identify the advertisement provider, a campaign ID for the specific campaign, and one or more content IDs to identify the contents in the campaign.

In certain embodiments, the central data module 147 provides a centralized data store for storing all or most information other than media files used by the signage device system 100.

The media files uploaded by the end users into the signage device system 100 typically are stored in the storage service 140. But the central data module 147 can store a collection of data specifying all the media files. Data relating to a particular media file can be organized in a particular media-file data structure. For example, data relating to a particular media file can include one or more of: the title of the file, the length of the file, the size of the file, the format of the file, a description of the contents of the file, a product category of the product being presented in an advertisement file, the target audience (e.g., demographic information) of the file, the target venues at which the file should be played. Further, the data also includes a storage link which can be used to retrieve the media file from the storage service 140.

For example, the central data module 147 can store a collection of data specifying each signage device 110 managed by the signage device system 100. Further, data relating to a particular signage device 110 can be organized in a particular signage device data structure. For example, data relating to the particular signage device 110 can include one or more of: a signage device ID identifying this particular signage device 110, one or more group IDs identifying one or more groups to which this particular signage device 110 belongs to, one or more network IDs identifying the one or more networks to which this particular signage device 110 belongs to, the popularity of the particular signage device 110, and the technical specification (e.g. resolution, size, and 3-D features) of the particular signage device 110.

Further, the central data module 147 can store a collection of data specifying campaign deployment plans as discussed above for each campaign. Further, data relating to a particular campaign deployment plan can be organized in a particular campaign-deployment-plan data structure. For example, data relating to a particular campaign deployment plan can include one or more of: a campaign ID identifying the campaign to which the particular deployment plan is directed, and one or more deployment entries. Each deployment entry can specify a content ID identifying a media file that is to be deployed, a group ID identifying the group of signage devices 110 to which a media file should be deployed or a signage device ID identifying a particular signage device 110 to which a media file should be deployed, and a timeslot of in which the deployed media file should be displayed.

Further, the central data module 147 can store a collection of data specifying timeslots of each signage device 110 that has been allocated to a campaign. Further, data relating to allocated timeslots of a particular signage device 110 can be organized in a particular allocated-timeslot data structure. Data relating to allocated timeslots of a particular signage device 110 can include one or more of: a signage device ID identifying the particular signage device 110 and a program entry for each of the allocated timeslots. The program entry can specify the specific time period of the associated timeslot, the price paid for that timeslot, a campaign ID identifying the campaign to which the timeslot is allocated, and a content ID identifying a media file that is to be displayed at this particular time slot.

In particular, the central data module 147 receives a write instruction from the media deployment module 142 specifying content and other information to be stored in the storage service in association with a particular campaign deployment plan.

A DSCS 149 is an interface module in communication with the diagnostic module 128 of the signage devices 110. When the DSCS 149 receives a deployment instruction for deploying or sending each media file in the campaign to the corresponding signage devices 110 according to the campaign deployment plan, the DSCS 149 does not send the information to be deployed to the signage device 110. Instead, the DSCS 149 waits for a request from the signage device 110. When the signage device 110 sends a request to the DSCS 149, the DSCS 149 sends the information requested (e.g., a program list of the contents according to the deployment instruction) to the signage device 110. In certain embodiments, in response to a request from the diagnostic module 128 of the signage device 110 for the information in the campaign deployment plan file, the DSCS 149 retrieves the requested information from the central data module 147, and sends the requested information back to the diagnostic module 128 of the signage device 110.

The DSCS 149 is in communication with each of the signage devices 110. As described above, the DSCS 149 can receive a campaign deployment instruction from the media deployment module 142. The campaign deployment instruction informs the DSCS 149 that a specific campaign is ready to be deployed to the intended signage devices 110. The DSCS 149 then can obtain a campaign deployment plan for that specific campaign. Based on the campaign deployment plan, the DSCS 149 can determine what media files should be distributed to which signage devices 110. Using the content IDs specified in the campaign deployment plan, the DSCS 149 can query the central data module 147 to obtain a storage link that can be used to retrieve the corresponding media file from the storage service 140. The next time a signage device 110 queries the DSCS 149 whether there is any media file to be delivered to that signage device 110, the DSCS 149 can inform the signage device 110 the media files and the associated storage links of the media files.

In certain embodiments, the media deployment module 142 instructs the DSCS 149 that a particular campaign is ready to be deployed by sending a campaign ID to the DSCS 149 in a message. Using the campaign ID, the DSCS 149 can retrieve a campaign deployment plan from the central data module 147. As described above, the campaign deployment plan specifies detail information regarding a particular campaign such as what media files should be played at which signage device 110 at which timeslots. In certain embodiments, a signage device 110 can periodically send requests to the DSCS 149 to check if there are media files or program list available to that signage device 110. The DSCS 149, in turn, can examine the campaign deployment plans to determine whether a media file is to be deployed to that signage device 110 and informs the results to the signage device 110.

The network 160 is a communication network between the signage device 110, the demographic information server 130, the storage service 140, the DSCS 149 and the remote management device 170. In certain embodiments, the network 160 may include wired or wireless network, and may be in the form of a mobile communication network, the Internet, the local area network (LAN), the wide area network (WAN), or a personal area network (PAN). The mobile communication network is a radio network system distributed over land areas called cells, and generally includes GSM, GPRS, HSPA, CDMA, WCDMA, WiMAX, LTE, satellite communication and many other mobile network systems. The PAN is a computer network system used for communication among computerized devices, which includes Wi-Fi, Zigbee, and Bluetooth networks. In certain embodiments, the network 160 is a cloud network.

The remote management device 170 is a computing device for remote managing the signage device 110. A user may remotely connect to the signage controller 111 of the signage device 110 from the remote management device 170 to change the settings of the signage device 110. In certain embodiments, the remote management device 170 may be a regular computer or a special purpose computer with wired or wireless network connectivity, such as a desktop computer or a laptop computer, or a mobile communication device, such as a smart phone or a tablet computer with wireless network connectivity.

Figure 3:
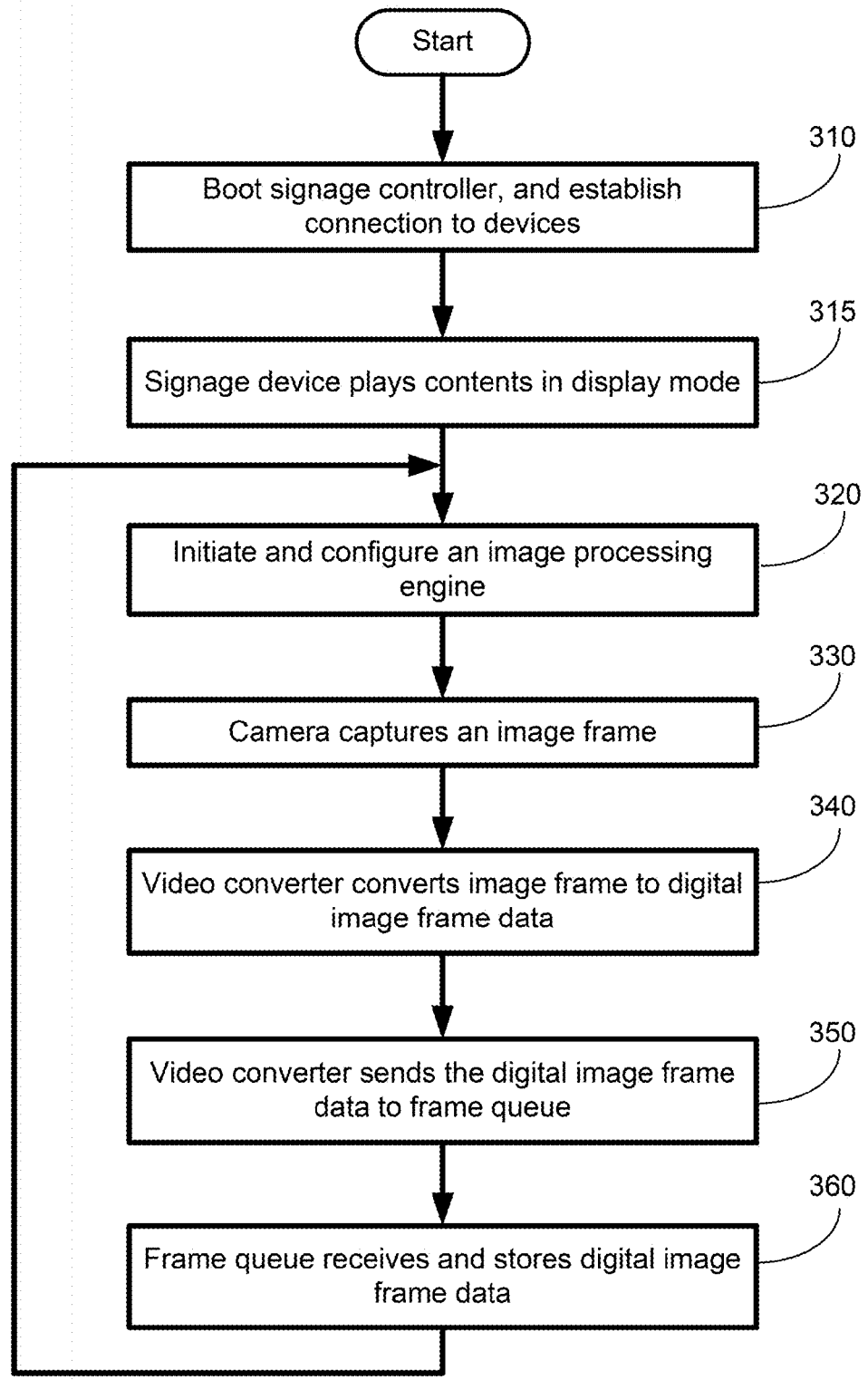
FIG. 3 shows an exemplary flow chart of the signage controller capturing the image and generating the digital image frame data according to one embodiment of the present disclosure.

FIG. 3 shows an exemplary flow chart of the signage device 110 capturing the image and generating the digital image frame data according to one embodiment of the present disclosure.

At operation 310, the signage controller 111 of the signage device 110 is booted, and the codes 120 are launched to establish connection to the devices, including the camera 150, the display device 155 and the network 160. The signage controller 111 launches the camera controlling module 122, the video converter 123, the demographic information collector 124 and the player manager module 129. In certain embodiments, a user may remotely access the signage controller 111 from the remote management device 170 via the network 160.

At operation 315, the signage device 110 starts playing contents in the display mode. The player manager module 129 has downloaded the contents according to the program list, and plays the contents at the specific time slots on the display device 155.

At operation 320, the image-processing-engine interface 125 of the demographic information collector 124 initiates one of the image processing engines (for example, the image processing engine 182), and sets up the configuration of the image processing engine 182.

At operation 330, the camera controlling module 122 controls the camera 150 to capture an image frame. The frame may include the viewers of the signage device 110 and other background images around the viewers.

Then, at operation 340, if the video signals generated by the camera are analog, the video converter 123 converts the analog video signals to digital image frame data. At operation 350, the video converter 123 sends the converted digital image frame data to the frame queue 127. At operation 360, the frame queue 127 receives and stores the digital image frame data.

FIG. 3 shows operations 320 to 350 in the display mode. However, it should be appreciated that, when the signage device 110 is switched to the diagnostic mode, the signage device 110 may continue performing operations 320 to 350 to capture the image and generate the digital image frame data.

Figure 4:
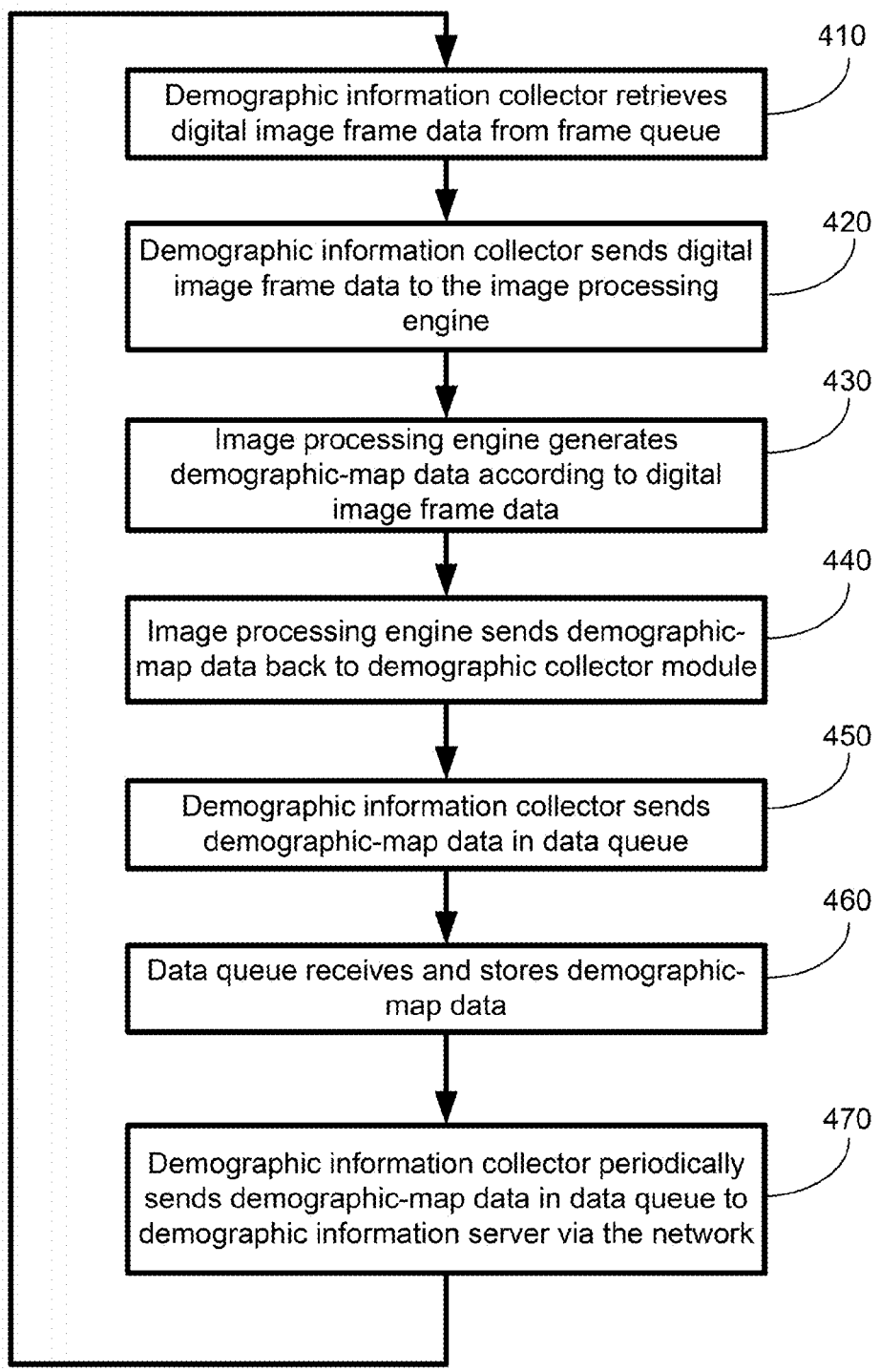
FIG. 4 shows an exemplary flow chart of the signage controller processing the digital image frame data according to one embodiment of the present disclosure.

FIG. 4 shows an exemplary flow chart of the signage controller processing the digital image frame data to generate the demographic-map data according to one embodiment of the present disclosure.

At operation 410, the demographic information collector 124 of the signage device 110 retrieves the digital image frame data of a frame from the frame queue 127. At operation 420, the demographic information collector 124 sends the retrieved digital image frame data to the image processing engine 182 for processing. At operation 430, the image processing engine 182 processes the digital image frame data and generates demographic-map data according to digital image frame data.

At operation 440, the image processing engine 182 sends back the demographic-map data back to the demographic information collector 124. At operation 450, the demographic information collector 124 sends the demographic-map data to the data queue 126. At operation 460, the data queue 126 receives and stores the demographic-map data.

At operation 470, the demographic information collector 124 periodically sends the demographic-map data in the data queue 126 to the demographic information server 130 via the network 160. It should be appreciated that the demographic information collector 124 does not remove the demographic-map data in the data queue 126. Instead, the demographic-map data are stored in the data queue 126 for a certain period of time (e.g., 3 days) for potential diagnostic purposes.

It should be appreciated that the signage controller may perform operations 410 to 470 for processing the digital image frame data to generate the demographic-map data in either the display mode or the diagnostic mode.

On the demographic information server 130 side, when the demographic information server 130 receives the demographic-map data from the signage controller 111 via the network 160, the demographic information server 130 stores the demographic information about time and location specified in the data structure in the data store 136. By storing demographic-map data structures continuously received from multiple service processors 110 at different locations, the demographic information server 130 eventually stores the demographic information at different locations and times. Further, the demographic information server 130 can process those data to identify any demographic patterns and trends.

On the storage service 140 side, the media deployment module 142 can request demographic information from the demographic information server 130 at the location of the signage and at a specific time period. Based on the demographic information received, the media deployment module 142 can choose a media content file for the specific time period, and determine a program list for the signage device 110. When the signage controller 111 requests the program list from the media deployment module 142, the media deployment module 142 sends the program list to the player manager module 129 of the signage controller 121. Thus, the player manager module 129 may then request and download the contents specified in the program list from the storage service 140. After downloading the contents, the player manager module 129 displays the downloaded contents on the display device 155 according to the program list.

Figure 5:
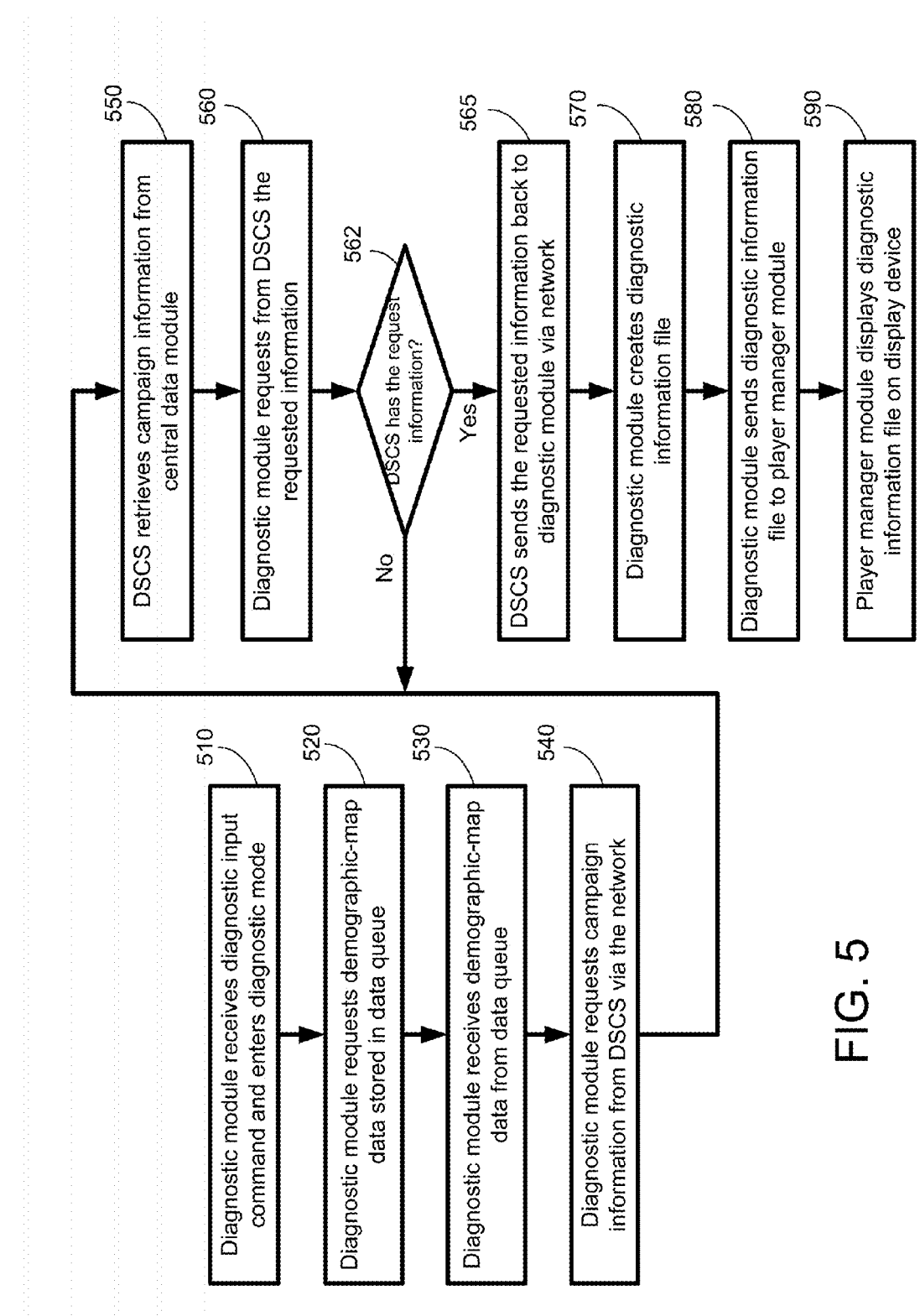
FIG. 5 shows an exemplary flow chart of the signage controller switching to the diagnostic mode according to one embodiment of the present disclosure.

FIG. 5 shows an exemplary flow chart of the signage controller switching to the diagnostic mode according to one embodiment of the present disclosure. In this embodiment, the diagnostic information may include the demographic-map data stored in the data queue 126 and campaign information related to the demographic-map data to indicate the relationship between the demographic-map data of the viewers and the related contents the viewers see at the time the demographic-map data is obtained. It should be appreciated that the diagnostic information may include other system information and operational information of the signage device 110.

At operation 510, the diagnostic module 128 receives a diagnostic input command and enters the diagnostic mode. As described above, the diagnostic input command may be generated by hand gestures, by encrypted codes such as QR codes, or by other input devices such as the USB drive, the RFID tags or the NFC tags.

At operation 520, the diagnostic module 128 requests demographic-map data stored in the data queue 126. At operation 530, the diagnostic module 128 receives the requested demographic-map data from the data queue 126.

At operation 540, the diagnostic module 128 requests campaign information from the DSCS 149 via the network 160. Upon receiving the request from the diagnostic module 128, the DSCS 149 enters operation 550. At operation 550, the DSCS 149 retrieves the requested campaign information from the central data module 147. As discussed above, the DSCS 149 then waits for the diagnostic module 128 to again request for the retrieved campaign information.

At operation 560, the diagnostic module 128 requests again for the earlier requested campaign information from the DSCS 149 via the network 160. Upon receiving the request from the diagnostic module 128, the DSCS 149 enters operation 562. At operation 562, the DSCS 149 checks if it has the requested campaign information. When the DSCS 149 has the requested campaign information, the DSCS 149 enters operation 565. When the DSCS 149 does not have the requested campaign information, the DSCS 149 goes back to operation 550 to retrieve the requested campaign information from the central data module 147.

At operation 565, the DSCS 149 sends the requested campaign information back to the diagnostic module 128 via the network 160. The campaign information includes one or more IDs identifying the specific content and the time slot for the content being displayed. In certain embodiments, the IDs of the content may include a provider ID corresponding to the content provider, a campaign ID corresponding to the campaign, and a content ID.

At operation 570, the diagnostic module 128 creates a diagnostic information file according to all received information, including the demographic-map data and the campaign information. At operation 580, the diagnostic module 128 sends the diagnostic information file to the player manager module 129. Upon receiving the diagnostic information file, at operation 590, the player manager module 129 displays the diagnostic information file on the display device 155.

The foregoing description of the example of the digital media management software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A signage device, comprising:
a display device, configured to display media content in a display mode and display diagnostic information in a diagnostic mode, wherein the media content is configured to be provided to the signage device by a server system, and wherein the diagnostic information comprises content operational and deployment information related to the media content being displayed, and system information of the signage device;
a camera configured to capture an image frame; and
a signage controller in communication with the display device and the camera, the signage controller comprising a processor and a non-volatile memory storing computer executable code, wherein the code is configured, when executed at the processor, to
control the camera to capture the image frame,
process the captured image frame to generate information for the server system, wherein the server system is configured to provide the media content to the signage controller based on the generated information, wherein the captured image frame is processed by:

detecting persons in the image frame,
generating a demographic-map data structure, wherein the demographic-map data structure contains demographic information of the persons detected in the image,
storing the demographic-map data structure in a data queue,
sending the demographic-map data structure stored in the data queue to the server system, and
receiving the media content provided by the server system in response to the demographic-map data structure,
display the media content on the display device in the display mode,
switch the display device from the display mode to the diagnostic mode in response to a diagnostic input command, and
display the diagnostic information on the display device in the diagnostic mode.

2. The signage device as claimed in claim 1, wherein the content operational and deployment information comprises the demographic-map data stored in the data queue and content information specifying the media content related to the demographic-map data.

3. The signage device as claimed in claim 1, wherein the code comprises:
a camera control module configured to control the camera to capture the image frame;
a video converter configured to convert the image frame to digital image frame data;
a demographic information collector configured to store the digital image frame data to a frame queue, to receive the demographic-map data structure from an image processing engine, to store the demographic-map data structure in the data queue, and to send the demographic-map data structure in the data queue to the server system;
a diagnostic module configured to receive the diagnostic input command, and to switch the signage device from the display mode to the diagnostic mode in response to the diagnostic input command; and
a player manager module configured to receive the media content provided by the server system in response to the demographic-map data structure, to display the media content on the display device in the display mode, and to display the diagnostic information on the display device in the diagnostic mode;
wherein the image processing engine is configured to retrieve the digital image frame data from the frame queue, to generate the demographic-map data structure according to the digital image frame data, and to send the demographic-map data structure to the demographic information collector; and
wherein the demographic information collector comprises an image-processing-engine interface, wherein the image-processing-engine interface defines a function to configure the image processing engine collecting information in the demographic-map data structure.

4. The signage device as claimed in claim 1, wherein the server system comprises:
a demographic information server in communication with the signage controller via a network, wherein the demographic information server is configured to receive the demographic-map data structure from the signage controller, and to generate demographic information according to the demographic-map data structure;
a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and
a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

5. The signage device as claimed in claim 4, wherein the demographic information server comprises a data store configured to store the demographic information.

6. The signage device as claimed in claim 4, wherein the storage service comprises:
a content storage configured to store the media content; and
a media deployment module configured to request the demographic information from the demographic information server, to generate the program list according to the demographic information, and to send the program list as the display content to the signage device via the network.

7. The signage device as claimed in claim 4, wherein the content operational and deployment information comprises the information requested from the DSCS.

8. A method of controlling a signage device, comprising:
controlling, by a signage controller of the signage device, a camera of the signage device to capture an image frame;
processing, by the signage controller, the captured image frame to generate information for a server system, wherein the server system is configured to provide media content to the signage controller based on the generated information, wherein the captured image frame is processed by:
detecting, by the signage controller, persons in the image frame,
generating, by the signage controller, a demographic-map data structure, wherein the demographic-map data structure contains demographic information of the persons detected in the image,
storing, by the signage controller, the demographic-map data structure in a data queue,
sending, by the signage controller, the demographic-map data structure stored in the data queue to the server system, and
receiving, by the signage controller, the media content provided by the server system in response to the demographic-map data structure;
displaying, by the signage controller, the media content on a display device of the signage device in a display mode;
switching, by the signage controller, the display device of the signage device from the display mode to a diagnostic mode in response to a diagnostic input command; and
displaying, by the signage controller, diagnostic information on the display device in the diagnostic mode, wherein the diagnostic information comprises content operational and deployment information related to the media content being displayed, and system information of the signage device.

9. The method as claimed in claim 8,
wherein the content operational and deployment information comprises the demographic-map data stored in the data queue and content information specifying the media content related to the demographic-map data.

10. The method as claimed in claim 8, wherein the signage controller comprises a non-volatile memory storing computer executable code, wherein the code comprises:
a camera control module configured to control the camera to capture the image frame;
a video converter configured to convert the image frame to digital image frame data;
a demographic information collector configured to store the digital image frame data to a frame queue, to receive the demographic-map data structure from an image processing engine, to store the demographic-map data structure in the data queue, and to send the demographic-map data structure in the data queue to the server system;
a diagnostic module configured to receive the diagnostic input command, and to switch the signage device from the display mode to the diagnostic mode in response to the diagnostic input command; and
a player manager module configured to receive the media content provided by the server system in response to the demographic-map data structure, to display the media content on the display device in the display mode, and to display the diagnostic information on the display device in the diagnostic mode;
wherein the image processing engine is configured to retrieve the digital image frame data from the frame queue, to generate the demographic-map data structure according to the digital image frame data, and to send the demographic-map data structure to the demographic information collector; and
wherein the demographic information collector comprises an image-processing-engine interface, wherein the image-processing-engine interface defines a function to configure the image processing engine collecting information in the demographic-map data structure.

11. The method as claimed in claim 8, wherein the server system comprises:
a demographic information server in communication with the signage controller via a network, wherein the demographic information server is configured to receive the demographic-map data structure from the signage controller, and to generate demographic information according to the demographic-map data structure;
a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and
a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

12. The method as claimed in claim 11, wherein the demographic information server comprises a data store configured to store the demographic information; and
wherein the content operational and deployment information comprises the information requested from the DSCS.

13. The method as claimed in claim 11, wherein the storage service comprises:
a content storage configured to store the media content; and
a media deployment module configured to request the demographic information from the demographic information server, to generate the program list according to the demographic information, and to send the program list as the display content to the signage device via the network.

14. A non-transitory computer readable medium storing computer executable code, wherein the code, when executed at a processor, is configured to:
control a camera of a signage device to capture an image frame,
process the captured image frame to generate information for a server system, wherein the server system is configured to provide media content to the signage device based on the generated information, wherein the captured image frame is processed by:
detecting persons in the image frame,
generating a demographic-map data structure, wherein the demographic-map data structure contains demographic information of the persons detected in the image,
storing the demographic-map data structure in a data queue,
sending the demographic-map data structure stored in the data queue to the server system, and
receiving the media content provided by the server system in response to the demographic-map data structure,
display the media content on a display device of the signage device in a display mode,
switch the display device of the signage device from the display mode to a diagnostic mode in response to a diagnostic input command, and
display diagnostic information on the display device in the diagnostic mode, wherein the diagnostic information comprises content operational and deployment information related to the media content being displayed, and system information of the signage device.

15. The non-transitory computer readable medium as claimed in claim 14,
wherein the content operational and deployment information comprises the demographic-map data stored in the data queue and content information specifying the media content related to the demographic-map data.

16. The non-transitory computer readable medium as claimed in claim 14, wherein the code comprises:
a camera control module configured to control the camera to capture the image frame;
a video converter configured to convert the image frame to digital image frame data;
a demographic information collector configured to store the digital image frame data to a frame queue, to receive the demographic-map data structure from an image processing engine, to store the demographic-map data structure in the data queue, and to send the demographic-map data structure in the data queue to the server system;
a diagnostic module configured to receive the diagnostic input command, and to switch the signage device from the display mode to the diagnostic mode in response to the diagnostic input command; and
a player manager module configured to receive the media content provided by the server system in response to the demographic-map data structure, to display the media content on the display device in the display mode, and to display the diagnostic information on the display device in the diagnostic mode;

wherein the image processing engine is configured to retrieve the digital image frame data from the frame queue, to generate the demographic-map data structure according to the digital image frame data, and to send the demographic-map data structure to the demographic information collector; and wherein the demographic information collector comprises an image-processing-engine interface, wherein the image-processing-engine interface defines a function to configure the image processing engine collecting information in the demographic-map data structure.

17. The non-transitory computer readable medium as claimed in claim 14, wherein the server system comprises:

a demographic information server in communication with the signage controller via a network, wherein the demographic information server is configured to receive the demographic-map data structure from the signage controller, and to generate demographic information according to the demographic-map data structure;

a storage service in communication with the signage controller via the network, wherein the storage service is configured to store the media content, to request the demographic information from the demographic information server, to generate a program list of the media content according to the demographic information, to receive a request for the program list from the signage controller via the network, and to send the program list to the signage controller via the network in response to the request for the program list; and a digital signage control service (DSCS) in communication with the signage controller via the network, wherein the DSCS is configured to store a campaign deployment plan file, to receive a request for information in the campaign deployment plan file, and to send the information to the signage controller in response to the request for the information.

18. The non-transitory computer readable medium as claimed in claim 17, wherein the demographic information server comprises a data store configured to store the demographic information; and wherein the storage service comprises:

a content storage configured to store the media content; and a media deployment module configured to request the demographic information from the demographic information server, to generate the program list according to the demographic information, and to send the program list as the display content to the signage device via the network.

19. The non-transitory computer readable medium as claimed in claim 18, wherein the content operational and deployment information comprises the information requested from the DSCS.

* * * * *